United States Patent
Rueger et al.

(10) Patent No.: US 8,568,526 B2
(45) Date of Patent: Oct. 29, 2013

(54) GLASS-CERAMIC DISCS FOR USE IN PIGMENTS

(75) Inventors: Reinhold Rueger, Roedermark (DE); Anke Geisen, Paderborn (DE); Gerald Karn, Pfungstadt (DE)

(73) Assignee: Merck Patent GmbH, Darmstadt (DE)

( * ) Notice: Subject to any disclaimer, the term of this patent is extended or adjusted under 35 U.S.C. 154(b) by 129 days.

(21) Appl. No.: 12/994,497

(22) PCT Filed: May 15, 2009

(86) PCT No.: PCT/EP2009/003486
§ 371 (c)(1),
(2), (4) Date: Nov. 24, 2010

(87) PCT Pub. No.: WO2009/152907
PCT Pub. Date: Dec. 23, 2009

(65) Prior Publication Data
US 2011/0129674 A1 Jun. 2, 2011

(30) Foreign Application Priority Data
May 27, 2008 (DE) .......................... 10 2008 025 277

(51) Int. Cl.
*C08K 3/40* (2006.01)
*C08K 3/36* (2006.01)

(52) U.S. Cl.
USPC ................................ 106/482; 501/32; 501/55

(58) Field of Classification Search
USPC ...................... 501/10, 32–36, 55–72; 106/482
See application file for complete search history.

(56) References Cited

U.S. PATENT DOCUMENTS

| | | | |
|---|---|---|---|
| 2,662,020 A | | 12/1953 | Schofield et al. |
| 4,140,645 A | * | 2/1979 | Beall et al. ........................ 501/4 |
| 5,565,388 A | * | 10/1996 | Krumwiede et al. ............ 501/70 |
| 7,740,899 B2 | | 6/2010 | Sridharan et al. |
| 2004/0139889 A1 | * | 7/2004 | Zimmermann et al. ...... 106/415 |
| 2006/0025513 A1 | * | 2/2006 | Nakagawa et al. ............ 524/494 |
| 2006/0048679 A1 | * | 3/2006 | Fujiwara et al. .............. 106/482 |
| 2007/0225424 A1 | | 9/2007 | Schulz et al. |
| 2007/0265154 A1 | | 11/2007 | Baldwin et al. |

FOREIGN PATENT DOCUMENTS

WO    WO 03/097546    11/2003

OTHER PUBLICATIONS

International Search Report of PCT/EP2009/003486, Date of Completion Sep. 21, 2009, Date of Mailing Oct. 6, 2009, 3 pages.
P.R. Hrma et al: "Property/composition relationships for Hanford high-level waste glasses melting at 1150° C; PNL Report 10359 to the US Department of Energy", 1994, Pacific Northwest National Laboratory, Richland, WA, USA, XP002544821.
L.R. Pinckney: "Glass-Ceramics", Kirk-Othmer Encyclopedia of Chemical Technology, Bd. 12, 2002, Seiten 626-644, XP002544820.

* cited by examiner

*Primary Examiner* — Pegah Parvini
(74) *Attorney, Agent, or Firm* — Millen, White, Zelano & Branigan, P.C.

(57) ABSTRACT

The present invention relates to a glass composition comprising crystalline phases, and to glass flakes produced therefrom. These glass flakes can be used as base substrate for effect pigments. The glass flakes can furthermore be used in paints, coatings, printing inks, plastics and in cosmetic formulations. The glass flakes are converted into glass-ceramics, and are present in one of the following composition ranges I or II in % by weight: I: 40-50 $SiO_2$, 10-20 $B_2O_3$, 10-20 $Na_2O$, 15-30 $TiO_2$; II: 10-60 $SiO_2$, 5-30 $B_2O_3$, 5-40 $TiO_2$, 2-20 $Nb_2O_5$, 2-20 $Fe_2O_3$, 5-40 $Na_2O+K_2O+CaO+SrO+BaO$.

23 Claims, No Drawings

GLASS-CERAMIC DISCS FOR USE IN PIGMENTS

The present invention relates to a glass composition comprising crystalline phases, and to glass flakes consisting thereof. These glass flakes can be used as base substrate for effect pigments. The glass flakes can furthermore be used in paints, coatings, printing inks, plastics and in cosmetic formulations.

Effect pigments based on glass flakes are known from the prior art. Thus, for example, thin glass flakes comprising high-refractive-index glasses are described in the U.S. Pat. No. 2,863,783. These glass flakes are employed as pearlescent pigments in coatings and plastics. However, the glass flakes described therein have the disadvantage that they preferably comprise high contents of toxic heavy metals, such as lead, arsenic or antimony. Glasses having higher contents of heavy-metal oxides generally have low softening temperatures and, in the form of thin flakes, are mechanically unstable at elevated temperatures. In addition, the glass flakes generally have low chemical stability. Furthermore, glass flakes of this type are distinguished by high density. Particularly thick and large flakes tend to sediment in paints, suspensions and melts and can only be stirred up again with difficulty.

The object of the present invention is to provide a glass formulation which comprises no toxic heavy metals, preferably has a refractive index>1.65 and at the same time is chemically and mechanically stable. It should be easy to produce dimensionally stable glass flakes from this glass composition. These glass flakes should be suitable, in uncoated or coated form, for paints, coatings, plastics, printing inks, cosmetic formulations and as filler and as base substrate for effect pigments.

A further object of the present invention consists in finding glass compositions which have strong absorption and/or a high scattering capacity for long-wavelength UV light (UV-A and UV-B) and are suitable, in the form of thin flakes or finely divided spherical particles, as UV-protection pigment, for example in sunscreens, in varnishes, as filler.

A further object of the invention is to find glass compositions which have an intense mass tone and, in the form of thin flakes, have high hiding power and/or exhibit a metallic lustre.

Surprisingly, it has now been found that glasses having a high refractive index are obtained if the glass formulation has at least one crystalline phase of a high-refractive-index metal oxide. The partial crystallisation of individual glass components increases the refractive index of the glass composition compared with the amorphous state.

In this way, high refractive indices can be achieved with significantly lower contents of high-refractive-index metal oxides than in glasses without partial crystallisation. At the same time, the softening temperature of the glasses is increased by the crystallite formation, which is of particular importance for the further processing of the glasses. If the crystalline phase is coloured, glasses having interesting colour effects can be produced.

The present invention thus relates to a glass composition comprising at least one crystalline phase, preferably a high-refractive-index metal oxide.

The invention likewise relates to a process for the preparation of the glass composition and to the use of the glasses, preferably in the form of glass flakes, in paints, coatings, powder coatings, plastics, in cosmetic formulations and as base substrate for the preparation of effect pigments.

The essential component of the glass composition according to the invention is at least one crystallisable high-refractive-index metal oxide. In this application, "high-refractive-index" is taken to mean a refractive index n of ≥1.8.

The crystallisable phase is preferably at least one high-refractive-index metal oxide. The crystallisable phase is very particularly preferably anatase ($TiO_2$) and/or rutile ($TiO_2$).

It is also possible for a plurality of, preferably two or three, high-refractive-index phases to be present alongside one another, in which case the phases are preferably
anatase ($TiO_2$)+rutile ($TiO_2$) or
rutile ($TiO_2$)+sodium niobate.

Suitable crystallisable high-refractive-index metal oxides are $TiO_2$ in the rutile modification, $TiO_2$ in the anatase modification, titanates, such as, for example, barium, strontium, calcium or bismuth titanates, titanium sub-oxides, niobates, such as, for example, sodium niobate, tantalates, tungstates, iron oxide, such as, for example, haematite or magnetite, iron titanate, such as, for example, ilmenite or pseudobrookite, or mixtures of the said high-refractive-index metal oxides. Particularly preferred high-refractive-index metal oxides are rutile and anatase.

The concentration of the high-refractive-index crystallisable metal-oxide component(s) in the glass composition according to the invention is preferably 3-70% by weight, in particular 15-50% by weight and very particularly preferably 20-40% by weight. The glass composition preferably comprises 3-70% by weight of anatase ($TiO_2$), rutile ($TiO_2$), titanate, niobate, iron oxide, tantalate, tungstate and/or iron titanate.

Besides the high-refractive-index metal-oxide component, the glass composition according to the invention comprises glass and network formers known to the person skilled in the art, such as, for example, $SiO_2$, $B_2O_3$, $P_2O_5$, $Na_2O$, $K_2O$, $CaO$, $Al_2O_3$, $MgO$ and/or $ZnO$.

A preferred glass composition comprises
10-60% by weight of $SiO_2$
5-30% by weight of $B_2O_3$
5-40% by weight of $TiO_2$
5-40% by weight of ($Na_2O+K_2O+MeO$, where Me=Ca, Sr and/or Ba)
2-20% by weight of $Nb_2O_3$
2-20% by weight of $Fe_2O_3$,
where the total amount is ≤100% by weight.

A particularly preferred glass comprises
40-50% by weight of $SiO_2$
10-20% by weight of $B_2O_3$
10-20% by weight of $Na_2O$
15-30% by weight of $TiO_2$,
where the total amount is ≤100% by weight.

The glass composition according to the invention preferably has a refractive index of >1.65, in particular >1.75.

For the preparation of the glasses according to the invention, the glass components are melted, with partial crystallisation taking place in the relatively cool zones even during preparation, depending on the glass composition. The glass composition obtained is preferably amorphous, and partial crystallisation is achieved by subsequent tempering of the glass at temperatures of 600-1100° C., preferably 700-1000° C.

A preferred glass composition is prepared by melting a glass composition consisting of/comprising 10-60% by weight of $SiO_2$, 5-30% by weight of $B_2O_3$, 5-40% by weight of $TiO_2$, 5-40% by weight of ($Na_2O+K_2O+MeO$, where Me=Ca, Sr and/or Ba), 2-20% by weight of $Nb_2O_3$ and 2-20% by weight of $Fe_2O_3$, where the total amount is ≤100% by weight, at >1000° C. to give liquid glass, allowing the latter to cool and solidify, and tempering the glass at >600° C. for 5 min-3 h.

The glass composition according to the invention can be used to produce glass flakes which are distinguished by the fact that they have a high softening temperature, preferably ≥700° C., and thus have high dimensional stability at high temperatures.

Softening temperature is taken to mean the temperature range in which the glass has the greatest change in deformability. The glass is transformed here from a brittler form into a softer, more elastic form. This transformation can be determined analytically, for example, with the aid of differential scanning calorimetry (DSC).

The softening temperature is not necessarily a fixed property of the glass composition. It is also dependent on the glass production process and in particular on the cooling rate or subsequent heat treatment (tempering).

In practice, uncoated glass flakes or glass flakes coated with one or more metal oxides and/or metals are still dimensionally stable and non-tacky up to the softening temperature and just above. At higher temperatures, deformation and sticking of the flakes occur. In the case of coated glass flakes or glass flakes comprising crystalline phases, the softening temperature can no longer be determined reliably with the aid of the DSC method. For these purely practical reasons, the softening temperature for uncoated and coated glass flakes is in this patent application intended to be taken to mean the temperature at which the flakes begin to deform or begin to stick to one another.

The glass flakes are produced, for example, by melting the batch of the glass composition according to the invention at elevated temperature, preferably at >1000° C., refining the melt and discharging the melt through a nozzle into a rotating cup. The flow forces in the rotating cup draw the inflowing glass out to form a thin lamella, which constantly solidifies at the edges and breaks up to form flakes.

In the simplest case, the partial crystallisation already takes place during preparation of the flakes in the relatively cool zones, i.e. at the edge of the lamella. However, the glass flakes obtained are preferably initially amorphous, and the partial crystallisation is achieved by subsequent tempering of the flakes. To this end, the flakes can be employed directly or previously subjected to post-treatment, for example leaching-out in water, acids or alkali or a coating.

A preferred variant of the preparation of glass flakes comprising crystalline phases is treatment of the thin flakes with acids or caustic lyes, preferably with acids, in aqueous suspension. Soluble components, for example in acids the network modifiers, such as, for example, alkali-metal or alkaline-earth metal oxides, are dissolved out of the glass flakes. Surprisingly, it has also been found that acid-soluble metal oxides may already partially crystallise here. These processes initially occur close to the surface, which can result in the formation of interference-capable thin layers of relatively high refractive index in the flakes during the leaching-out process. Suitable control of this process gives access to glass flakes having interesting interference colours without the need to coat the flakes.

Substantial elution of the alkali-metal and alkaline-earth metal ions out of the glass flakes causes a considerable increase in the softening temperature of the glass flakes. Glass flakes having crystalline phases which have been leached out in an acidic medium preferably comprise less than 5 mol % of alkali-metal and alkaline-earth metal ions, particularly preferably less than 3 mol %. Glass flakes of this type can be heated to 1000° C. or even above without deformation. Calcination at elevated temperatures, for example ≥400° C., causes the crystallisation of the high-refractive-index metal-oxide phases in the flakes to continue. In this way, even metal oxides which do not crystallise spontaneously or do not crystallise completely during the leaching-out process can be converted into a crystalline phase.

A preferred glass composition after the leaching-out, for example an acid treatment, of the thin flakes is
50-70% by weight of $SiO_2$
30-50% by weight of $TiO_2$
0-3% by weight of $Na_2O$
where the total amount is ≤100% by weight, based on the glass flake.

It is also possible to incorporate metal ions, anions or neutral molecules, for example iron ions, manganese ions, ions of the rare earths or phosphates, into the glass matrix during or after the leaching-out process. These ions can interact with the metal oxides present in the glass, be doped into the crystal phases or form mixed crystals directly or during the calcination. In this way, it is possible to produce coloured, opaque, luminescent or dark flakes.

A further possibility for the preparation of coloured or dark flakes or flakes with a metallic lustre is the reduction of glass flakes comprising crystalline phases at elevated temperature, for example using elemental hydrogen (forming gas), using hydrocarbon compounds, using ammonia or, for example, using elemental carbon or silicon. Through reaction with ammonia, melamine or other nitrogen-containing compounds, the high-refractive-index phases can be doped with nitrogen in the form of nitride and partially converted into nitrides.

Alternative preparation processes for glass flakes comprising the glass composition according to the invention are, for example, foaming of liquid glass and comminution of the solidified glass foam or glass blowing and the comminution of the thin-walled hollow glass bodies.

The glass flakes preferably have a thickness of 0.2 to 10 μm, in particular 0.3-3 μm.

The diameter of the glass flakes is preferably 5-300 μm, particularly preferably 10-100 μm, furthermore 5-60 μm.

The glass flakes preferably have a refractive index of >1.65, in particular >1.75.

The invention also relates to a process for the preparation of glass flakes of this type.

The glass flakes produced in this way consisting of the glass composition according to the invention are distinguished not only by their high refractive index and chemical and mechanical stability, but also by their optical effects. In the formulations, the glass flakes exhibit, depending on the type and size of the crystalline phases, high transparency, high lustre and intense glitter effects, but also intense mass tones with high lustre and good hiding power.

The glass flakes are highly suitable as substrate in the preparation of effect pigments. To this end, they are preferably coated with one or more metal oxides. The metal oxides are preferably $TiO_2$ (anatase or rutile), $Fe_2O_3$ or a $TiO_2/Fe_2O_3$ mixture. It is frequently advisable to coat the glass flakes with an $SiO_2$ layer in advance before application of one or more metal oxides. The $SiO_2$ coating protects the glass surface against chemical change, such as swelling, leaching-out of glass constituents or dissolution in the aggressive acidic coating solutions. The softening temperature is also significantly increased by the $SiO_2$ coating. The final pigments are furthermore distinguished by their optical properties, in particular by increased lustre.

Particularly preferred effect pigments based on the glass flakes according to the invention preferably have the following oxide coatings:
glass flake+$TiO_2$
glass flake+$TiO_2/Fe_2O_3$ glass flake+$Fe_2O_3$
glass flake+$TiO_2$+$Fe_2O_3$
glass flake+$TiO_2$+$Fe_3O_4$
glass flake+$TiO_2$+$SiO_2$+$TiO_2$
glass flake+$Fe_2O_3$+$SiO_2$+$TiO_2$
glass flake+$TiO_2$/$Fe_2O_3$+$SiO_2$+$TiO_2$
glass flake+$TiO_2$+$SiO_2$+$TiO_2$/$Fe_2O_3$
glass flake+$TiO_2$+$SiO_2$
glass flake+$TiO_2$+$SiO_2$/$Al_2O_3$
glass flake+$TiO_2$+$Al_2O_3$
glass flake+$SnO_2$
glass flake+$SiO_2$
glass flake+$SiO_2$+$TiO_2$
glass flake+$SiO_2$+$TiO_2$/$Fe_2O_3$
glass flake+$SiO_2$+$Fe_2O_3$
glass flake+$SiO_2$+$TiO_2$+$Fe_2O_3$
glass flake+$SiO_2$+$TiO_2$+$Fe_3O_4$
glass flake+$SiO_2$+$TiO_2$+$SiO_2$+$TiO_2$
glass flake+$SiO_2$+$Fe_2O_3$+$SiO_2$+$TiO_2$
glass flake+$SiO_2$+$TiO_2$/$Fe_2O_3$+$SiO_2$+$TiO_2$
glass flake+$SiO_2$+$TiO_2$+$SiO_2$+$TiO_2$/$Fe_2O_3$
glass flake+$SiO_2$+$TiO_2$+$SiO_2$
glass flake+$SiO_2$+$TiO_2$+$SiO_2$/$Al_2O_3$
glass flake+$SiO_2$+$TiO_2$+$Al_2O_3$ The glass flakes can be coated with one metal-oxide layer or with two, three, four or more metal-oxide layers. In this application, coating is taken to mean the complete enveloping of the untreated or leached-out glass flakes according to the invention.

The coating of the glass flakes with one or more metal oxides is preferably carried out by wet-chemical methods, it being possible to use the wet-chemical coating methods developed for the preparation of pearlescent pigments. Methods of this type are described, for example, in DE 14 67 468, DE 19 59 988, DE 20 09 566, DE 22 14 545, DE 22 15 191, DE 22 44 298, DE 23 13 331, DE 15 22 572, DE 31 37 808, DE 31 37 809, DE 31 51 343, DE 31 51 354, DE 31 51 355, DE 32 11 602, DE 32 35 017 or also in further patent documents and other publications known to the person skilled in the art.

In the case of wet coating, the glass flakes are suspended in water, and one or more hydrolysable metal salts or a water-glass solution is (are) added at a pH which is suitable for hydrolysis, which is selected in such a way that the metal oxides or metal-oxide hydrates are precipitated directly onto the flakes without secondary precipitations occurring. The pH is usually kept constant by simultaneous metered addition of a base and/or acid. The pigments are subsequently separated off, washed and dried at 50-150° C. for 6-18 h and calcined for 0.5-3 h, where the calcination temperature can be optimised with respect to the respective coating present. In general, the calcination temperatures are 500-1000° C., preferably 600-900° C. If desired, the pigments can be separated off after application of individual coatings, dried and optionally calcined and then re-suspended again for the application of the further layers.

The application of the $SiO_2$ layer to the glass flake and/or to the already coated substrate is generally carried out by addition of a potassium or sodium water-glass solution at a suitable pH.

Furthermore, the coating can also be carried out in a fluidised-bed reactor by gas-phase coating, it being possible to use, for example, the methods proposed in EP 0 045 851 and EP 0 106 235 for the preparation of pearlescent pigments correspondingly.

In order to increase the light, water and weather stability, it is frequently advisable to subject the finished pigment to post-coating or post-treatment, depending on the area of application. Suitable post-coating or post-treatment methods are, for example, the methods described in German Patent 22 15 191, DE-A 31 51 354, DE-A 32 35 017 or DE-A 33 34 598. This post-coating further increases the chemical and photochemical stability or simplifies handling of the pigment, in particular incorporation into various media. In order to improve the wettability, dispersibility and/or compatibility with the application media, functional coatings of $SiO_2$, $Al_2O_3$ or $ZrO_2$ or mixtures thereof can, for example, be applied to the pigment surface. Furthermore, organic post-coatings are possible, for example with silanes, as described, for example, in EP 0 090 259, EP 0 634 459, WO 99/57204, WO 96/32446, WO 99/57204, U.S. Pat. No. 5,759,255, U.S. Pat. No. 5,571,851, WO 01/92425 or in J. J. Ponjeé, Philips Technical Review, Vol. 44, No. 3, 81 ff. and P. H. Harding, J. C. Berg, J. Adhesion Sci. Technol. Vol. 11 No. 4, pp. 471-493.

The invention thus also relates to the use of the coated or uncoated glass flakes in formulations from the areas of paints, coatings, automobile paints, powder coatings, printing inks, security printing inks, plastics, ceramic materials, cosmetics. The coated and uncoated glass flakes can furthermore be employed in glasses, in paper, in paper coating, in toners for electrophotographic printing processes, in seed, in greenhouse sheeting and tarpaulins, as absorber in the laser marking of paper and plastics, as absorber in the laser welding of plastics, in pigment pastes with water, organic and/or aqueous solvents, in pigment preparations and dry preparations, such as, for example, granules, as UV-protection pigment, for example in clear coats in the industrial and automobile sectors, in sunscreens, as filler, in particular in cosmetics.

All percentage data in this application are per cent by weight, unless indicated otherwise.

The following examples are intended to explain the invention in greater detail, but without restricting it.

EXAMPLES

Example 1

Preparation of a Glass Composition Having a Crystalline Phase

Quartz sand, titanium dioxide, borax and soda are melted at 1350° C. in a platinum crucible to give a liquid glass. The composition of the glass in by weight is
46% by weight of $SiO_2$
16% by weight of $B_2O_3$
14% by weight of $Na_2O$
24% by weight of $TiO_2$.

The glass is poured into a mould, cooled rapidly and solidified. Thin sections are produced from the resultant glass block. The glass is colourless and transparent, and the refractive index is 1.64. The glass is X-ray amorphous.

Samples of the glass produced in this way are tempered at 650° C. for 30 minutes and at 750° C. for a further 3 hours and subsequently cooled. The glass is now whitish-opaque. The refractive index of the glass is 1.76.

Analysis by means of X-ray diffraction (Stoe Stadi 611KL X-ray powder diffractometer, Cu-Kα1 radiation) confirms the presence of $TiO_2$ in the rutile modification in the glass.

Example 2

Preparation of a Glass Composition Having a Crystalline Phase

Quartz sand, titanium dioxide, niobium oxide, borax and soda are melted at 1350° C. in a platinum crucible to give a liquid glass. The composition of the glass in % by weight is 12% by weight of $SiO_2$ 14% by weight of $B_2O_3$ 12% by weight of $Na_2O$ 16% by weight of $TiO_2$ 46% by weight of $Nb_2O_3$.

The glass is poured into a mould, cooled rapidly and solidified. Thin sections are produced from the resultant glass block. The glass is colourless and transparent, and the refractive index is 1.85-1.9.

Samples of the glass produced in this way are tempered at 650° C. for 30 minutes and at 800° C. for a further 3 hours and subsequently cooled. The glass is now opaque and exhibits pronounced pearlescence. The refractive index is 2.

Analysis by means of X-ray diffraction (Stoe Stadi 611KL X-ray powder diffractometer, Cu-Kα1 radiation) confirms the presence of rutile $TiO_2$ and crystalline sodium niobate in the glass.

Example 3

Preparation of Glass Flakes

The glass composition from Example 1 is melted in a platinum tank and discharged through a nozzle at 1050° C. into a flaker device with rotating cup. Glass flakes having a thickness of about 1.2 μm are obtained. The glass flakes are ground and classified by means of an air-jet mill.

100 g of the glass flakes from Example 3 are stirred in 1 liter of water at 80° C. and pH 1.8 for 48 hours, during which the pH is adjusted and kept constant using hydrochloric acid. During this operation, the sodium ions are substantially eluted, and 14.5 g of HCl are consumed. The flakes are subsequently filtered off, dried and calcined at 800° C. for 1 hour. A silvery white pigment powder is obtained. The pigment powder is incorporated into a nitrocellulose lacquer and coated onto a paint card. A silvery white coating layer with pronounced glitter effect is obtained.

UV/VIS spectra of samples of the uncalcined and calcined glass flakes are recorded in aqueous suspension. The spectra show a long-wavelength shift of the absorption band of the $TiO_2$. In contrast to the uncalcined glass flakes, which exhibit increasing absorption from 310 to 230 nm, the absorption band of the calcined glass flakes begins as early as 375 nm and reaches the maximum as early as 325 nm. The spectra of the calcined glass flakes correspond to that of nanoscale anatase $TiO_2$. The result shows that the glass flakes after calcination comprise crystalline $TiO_2$.

Example 4

Preparation of Crystalline $TiO_2$-Containing Glass Flakes

Quartz sand, titanium dioxide and soda are melted at 1450° C. in a platinum crucible to give a liquid glass. The composition of the glass in % by weight is 36% by weight of $SiO_2$ 23% by weight of $Na_2O$ 41% by weight of $TiO_2$.

The melt is then discharged through a nozzle at 1100° C. in a narrow jet into a flaker device with rotating cup. Glass flakes having a thickness of about 0.8 μm are obtained. The flakes obtained are subsequently ground and classified by means of an air-jet mill.

Example 5

Acid Treatment of the Titanium Dioxide-Containing Glass Flakes

A sample of the glass flakes from Example 4 is stirred at 80° C. for 48 hours in 10% aqueous suspension. The pH of the suspension is adjusted to 1.8 and kept constant using hydrochloric acid. The suspension is subsequently brought to room temperature, and the glass flakes are filtered off, washed with water and dried overnight at 110° C.

Calcination experiments are carried out with samples of the glass flakes in order to determine the softening temperature. To this end, the samples are each calcined at the respective temperature for 30 minutes. As comparison, a sample of the glass flakes from Example 4 without acid treatment is investigated.

Whereas the glass flakes from Example 4 stick even at 650° C., the acid-treated glass flakes have still not softened and are dimensionally stable even at 1000° C.

The glass flakes obtained in calcination experiments are investigated for crystalline contents with the aid of X-ray diffractometry. No crystalline phases are found here in the case of glass flakes from Example 4 at 600° C., whereas rutile and anatase are detected in the calcined samples (600° C., 750° C. and 950° C.).

A refractive index of 1.9 is determined with the aid of the immersion method for the sample calcined at 950° C.

Samples of the glass flakes calcined at 950° C. are incorporated into a nitro-cellulose lacquer and applied to paint cards. The paint cards exhibit a pronounced glitter effect under directed illumination.

Example 6

Preparation of Effect Pigments by Coating the Glass Flakes with Rutile $TiO_2$

Interference pigments are produced from the glass flakes from Example 5 by coating with titanium dioxide in acidic aqueous suspension. To this end, 100 g of glass flakes are suspended in 1 liter of water 0.48 g of a 3.3% $SnCl_4$ solution in hydrochloric acid are added dropwise at 75° C. with stirring, and a titanium tetrachloride solution in hydrochloric acid is subsequently metered in. Pigments of different interference colour are obtained by taking samples during the titanium-dioxide precipitation. The samples are filtered off, washed and dried, subsequently calcined and finally sieved. The softening points are determined by calcination at various temperatures at intervals of 50° C. The pigments are stable up to 1000° C., with no evidence of deformation or sticking. Paint cards are produced from the pigments in order to assess the coloristic properties. The paint cards of the pigments are distinguished by high chromaticity and high lustre.

X-ray diffraction patterns of samples of the pigments are recorded. The analyses show rutile as the predominant titanium dioxide modification.

Example 7

Preparation of Effect Pigments by Coating the Glass Flakes with Anatase $TiO_2$

Glass flakes from Example 5 are coated with titanium dioxide as described in Example 6, but without the pre-seeding with tin dioxide. The pigment samples are worked up and calcined as described in Example 5. The pigments are likewise stable up to 1000° C.

In contrast to the pigments with tin dioxide pre-seeding, X-ray diffractometry shows anatase as the sole titanium dioxide modification.

Example 8

Comparison

Commercially available glass flakes made from ECR glass having a thickness of about 850 nm are ground and classified. A fraction having a $d_{50}$ of about 80 µm is obtained.

100 g of these glass flakes are coated firstly with tin dioxide and subsequently with titanium dioxide in acidic aqueous suspension, as described in Example 5. Pigments of different interference colour are obtained by taking samples during the titanium-dioxide precipitation. The samples are filtered off, washed and dried. Pigment samples are subsequently calcined at 650° C. and 750° C. and finally sieved. Whereas the samples calcined at 650° C. are finely pulverulent and exhibit neither deformation nor agglomeration, the samples calcined at 750° C. are highly agglomerated, and numerous pigment particles are bent and stuck together. Paint cards are produced from the pigments in order to assess the coloristic properties. The paint cards of the pigments calcined at 650° C. are distinguished by high chromaticity and high lustre, whereas the pigments calcined at 750° C. cause a rough coating surface and exhibit virtually no interference colours. The results show that the softening point of the comparative pigments is in the order of 650-700° C., whereas a softening point cannot be found up to 1000° C. in the case of the pigments according to the invention.

Example 9

Uncoloured UV-Protection Pigment

Quartz sand, titanium dioxide and soda are melted at 1450° C. in a platinum crucible to give a liquid glass. The composition of the glass in % by weight is
41% by weight of $SiO_2$
28% by weight of $Na_2O$
31% by weight of $TiO_2$.

The melt is then discharged through a nozzle at 1100° C. in a narrow jet into a flaker device with rotating cup. Glass flakes having a thickness of about 0.3 µm are obtained. The flakes obtained are subsequently ground and classified by means of an air-jet mill.

100 g of the glass flakes are stirred in 1 liter of water at 80° C. and pH=1.8 for 24 hours, during which the pH is kept constant by addition of hydrochloric acid. Titanium dioxide is subsequently precipitated by slow dropwise addition of titanium tetrachloride solution. The pH is kept constant during the precipitation by addition of sodium hydroxide solution. In order to assess the interference colours, samples are taken during the coating, and the coating is terminated when an uncoloured end point has been reached. The pigment obtained is filtered off, washed and calcined at 900° C. The evaluation of the pigment in the paint card gives a very weakly coloured pigment with weakly yellow-green interference. The UV/VIS spectrum of a sample of the pigment is recorded in highly diluted aqueous suspension. The spectrum shows a strong absorption band in the UV-A and UV-B regions, beginning at 375 nm.

Owing to its UV-absorbing properties, the pigment is suitable for use in sunscreen creams and lotions or as UV-absorbent cosmetic filler.

Example 10

Blue and Silver-White Interference Pigments

Glass flakes having the composition from Example 4 and a thickness of 450 nm are stirred at 80° C. for 10 hours in 10% aqueous suspension. The pH of the suspension is adjusted to 1.8 and kept constant using hydrochloric acid. A sample of the suspension is taken, filtered, washed at 110° C., dried and calcined at 750° C. (sample 10-1). The main amount of the suspension is stirred for a further 40 hours. The suspension is subsequently brought to room temperature, and the glass flakes are filtered off, washed with water and dried overnight at 110° C. and likewise calcined at 750° C. (sample 10-2). Paint cards are produced from the calcined glass flakes. The paint card from sample 10-1 shows an intensely blue interference pigment with high lustre, while the paint card from 10-2 has a high-lustre, silver-white interference colour.

Example 11

Reduction

Dried glass flakes of sample 10-2 from Example 10 are calcined at 550° C. for 30 min under forming gas (92% of $N_2$/8% of $H_2$). After cooling under forming gas, a silvery grey pigment powder is obtained. The pigment powder is stirred into nitrocellulose lacquer, and paint coats on PET film and on paint cards are produced using the lacquer. The layer thickness of the dry layer is about 50 µm, and the pigment volume concentration is 10%. An aluminium-coloured lacquer layer with a metallic appearance and high hiding power is obtained.

Example 12

Reduction

Dried glass flakes of sample 10-2 from Example 10 are calcined at 850° C. for 30 min under forming gas (92% of $N_2$/8% of $H_2$). After cooling under forming gas, a blue-grey pigment powder is obtained. The pigment powder is stirred into nitrocellulose lacquer, and paint cards are coated therewith. The paint cards show a blue lustre pigment with high hiding power and metallic lustre.

The invention claimed is:
1. Glass flakes, which have been subjected to leaching-out in water, an acid or a caustic lye, which after the leaching-out, have a composition comprising
  50-70% by weight of $SiO_2$
  30-50% by weight of $TiO_2$
  0-3% by weight of $Na_2O$,
  where the total amount is ≤100% by weight, based on the glass flake, and which before the leaching out, had a composition that comprised at least one crystalline phase, wherein the glass flakes have one of the following oxide coatings:
  glass flake+$TiO_2$
  glass flake+$TiO_2$/$Fe_2O_3$
  glass flake+$Fe_2O_3$
  glass flake+$TiO_2$+$Fe_2O_3$
  glass flake+$TiO_2$+$Fe_3O_4$
  glass flake+$TiO_2$+$SiO_2$+$TiO_2$
  glass flake+$Fe_2O_3$+$SiO_2$+$TiO_2$ glass flake+$TiO_2$/$Fe_2O_3$+$SiO_2$+$TiO_2$
glass flake+$TiO_2$+$SiO_2$+$TiO_2$/$Fe_2O_3$
glass flake+$TiO_2$+$SiO_2$
glass flake+$TiO_2$+$SiO_2$/$Al_2O_3$
glass flake+$TiO_2$+$Al_2O_3$
glass flake+$SnO_2$
glass flake+$SiO_2$
glass flake+$SiO_2$+$TiO_2$
glass flake+$SiO_2$+$TiO_2$/$Fe_2O_3$
glass flake+$SiO_2$+$Fe_2O_3$
glass flake+$SiO_2$+$TiO_2$+$Fe_2O_3$
glass flake+$SiO_2$+$TiO_2$+$Fe_3O_4$
glass flake+$SiO_2$+$TiO_2$+$SiO_2$+$TiO_2$
glass flake+$SiO_2$+$Fe_2O_3$+$SiO_2$+$TiO_2$
glass flake+$SiO_2$+$TiO_2$/$Fe_2O_3$+$SiO_2$+$TiO_2$
glass flake+$SiO_2$+$TiO_2$+$SiO_2$+$TiO_2$/$Fe_2O_3$
glass flake+$SiO_2$+$TiO_2$+$SiO_2$
glass flake+$SiO_2$+$TiO_2$+$SiO_2$/$Al_2O_3$ or
glass flake+$SiO_2$+$TiO_2$+$Al_2O_3$.

2. Glass flakes according to claim 1, which before the leaching out, had a composition that had a refractive index of >1.65.

3. Glass flakes according to claim 1, which before the leaching out, had a composition that comprised at least one crystalline high-refractive-index (refractive index n≥1.8) phase of a metal oxide.

4. Glass flakes according to claim 1, which before the leaching out, had a composition that comprised at least one crystalline phase of rutile ($TiO_2$), anatase ($TiO_2$), titanate, niobate, titanium suboxide, iron oxide, tantalate, tungstate, iron oxide and/or iron titanate or a mixture thereof.

5. Glass flakes according to claim 1, which before the leaching out, had a composition that comprised a crystalline phase of barium titanate, strontium titanate, calcium titanate and/or bismuth titanate.

6. Glass flakes according to claim 1, which before the leaching out, had a composition that comprised a crystalline phase of sodium niobate.

7. Glass flakes according to claim 1, which before the leaching out, had a composition that comprised a crystalline phase of haematite and/or magnetite.

8. Glass flakes according to claim 1, which before the leaching out, had a composition that comprised a crystalline phase of ilmenite and/or pseudobrookite.

9. Glass flakes according to claim 1, which before the leaching out, had a composition that comprised a crystalline phase of rutile ($TiO_2$) and/or a crystalline phase of anatase ($TiO_2$).

10. Glass flakes according to claim 1, which before the leaching out, had a composition that comprised 3-70% by weight of anatase ($TiO_2$), rutile ($TiO_2$), titanate, niobate, iron oxide, tantalate, tungstate and/or iron titanate.

11. Glass flakes according to claim 1, which before the leaching out, had a composition that comprised
40-50% by weight of $SiO_2$
10-20% by weight of $B_2O_3$
10-20% by weight of $Na_2O$
15-30% by weight of $TiO_2$,
where the total amount is ≤100% by weight.

12. Glass flakes according to claim 1, which before the leaching out, had a composition that comprised
10-60% by weight of $SiO_2$
5-30% by weight of $B_2O_3$
5-40% by weight of $TiO_2$
5-40% by weight of ($Na_2O$+$K_2O$+MeO, where Me=Ca, Sr and/or Ba)
2-20% by weight of $Nb_2O_3$
2-20% by weight of $Fe_2O_3$,
where the total amount is ≤100% by weight.

13. A process for preparing glass flakes according to claim 1, comprising melting a glass composition comprising at least one crystallizable high-refractive-index metal oxide at >1000° C. to form liquid glass, which is allowed to cool and solidify, and the resultant glass is tempered at >600° C. for 5 min.-3 h.

14. A process for preparing glass flakes according to claim 1, comprising melting a glass composition comprising 10-60% by weight of $SiO_2$, 5-30% by weight of $B_2O_3$, 5-40% by weight of $TiO_2$, 5-40% by weight of ($Na_2O$+$K_2O$+MeO, where Me=Ca, Sr and/or Ba), 2-20% by weight of $Nb_2O_3$ and 2-20% by weight of $Fe_2O_3$, where the total amount is ≤100% by weight, at >1000° C. to form liquid glass, which is allowed to cool and solidify, and the resultant glass is tempered at >600° C. for 5 min-3 h then is subjected to leaching out.

15. A process for preparing glass flakes according to claim 1, comprising forming flakes from a glass composition that comprises at least one crystalline phase.

16. A process for preparing glass flakes according to claim 1, comprising
melting a glass composition that comprises at least one crystalline phase at a temperature >1000° C., refining and discharging the melt through a nozzle into a rotating cup, where the inflowing glass is drawn out in the rotating cup to form a thin lamella, which constantly solidifies at the edges and breaks up to form flakes, or
flakes are obtained by foaming liquid glass and comminuting the solidified glass foam, or
flakes are obtained by glass blowing and comminution of the thin-walled hollow glass bodies.

17. A process for preparing glass flakes according to claim 1, comprising subjecting glass flakes which comprise at least one crystalline phase to leaching-out in water, an acid or a caustic lye.

18. Glass flakes according to claim 1, which have been subjected to leaching-out in water.

19. A paint, coating, printing ink, plastic, cosmetic formulation, pigment paste, pigment preparation, substrate for effect pigments, filler, UV-protection pigment, absorber in the laser marking of plastics, or an absorber in the laser welding of plastics, comprising glass flakes of claim 1.

20. Effect pigments, which are based on glass flakes according to claim 1.

21. UV-protection pigments, comprising glass flakes according to claim 1.

22. Glass flakes according to claim 1, which have been subjected to leaching-out in an acid.

23. Glass flakes according to claim 1, which have been subjected to leaching-out in a caustic lye.

* * * * *